US009366566B2

(12) United States Patent
Frank et al.

(10) Patent No.: US 9,366,566 B2
(45) Date of Patent: Jun. 14, 2016

(54) OFFSET CURRENT COMPENSATION FOR PHOTODIODES

(71) Applicant: International Business Machines Corporation, Armonk, NY (US)

(72) Inventors: Matthew B. Frank, Rochester, MN (US); Raymond A. Richetta, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/284,965

(22) Filed: May 22, 2014

(65) Prior Publication Data

US 2015/0338269 A1 Nov. 26, 2015

(51) Int. Cl.
*H03F 3/08* (2006.01)
*G01J 1/18* (2006.01)
*G01J 1/42* (2006.01)
*G01J 1/44* (2006.01)

(52) U.S. Cl.
CPC .................. *G01J 1/18* (2013.01); *G01J 1/4228* (2013.01); *G01J 1/44* (2013.01); *G01J 2001/444* (2013.01); *G01J 2001/446* (2013.01)

(58) Field of Classification Search
CPC ..... G01J 1/4228; G01J 1/1626; G01J 1/1684; G01J 2001/444; H04N 5/361
USPC ..................................................... 250/214 A
See application file for complete search history.

(56) References Cited

U.S. PATENT DOCUMENTS

| 4,857,725 | A | 8/1989 | Goodnough et al. |
|---|---|---|---|
| 6,803,825 | B2 | 10/2004 | Chiou et al. |
| 7,405,386 | B2 | 7/2008 | Shimizu et al. |
| 8,129,672 | B2 | 3/2012 | Huang et al. |
| 8,242,430 | B2 | 8/2012 | Dyer |
| 8,575,971 | B1 | 11/2013 | Chamakura |
| 2007/0090276 | A1 | 4/2007 | Peng et al. |
| 2011/0192958 | A1* | 8/2011 | Huang ............... G01J 1/46 250/214 A |
| 2013/0294766 | A1 | 11/2013 | Cai et al. |

OTHER PUBLICATIONS

Frank, M. et al., "Offset Current Compensation for Photodiodes," U.S. Appl. No. 14/510,208, filed Oct. 9, 2014.
IBM, "List of IBM Patents or Patent Applications Treated as Related," Oct. 7, 2014.

* cited by examiner

*Primary Examiner* — Thanh Luu
(74) *Attorney, Agent, or Firm* — Wood, Herron & Evans, LLP; Robert R. Williams

(57) ABSTRACT

A dark photodiode that is optically isolated from the signal photodiode and having a dark current in the absence of photons. A reference generating circuit configured to produce a reference voltage based on voltage at an anode of the signal photodiode. A voltage regulator circuit configured to regulate dark photodiode voltage at an anode of the dark photodiode based on the reference voltage. A current mirror circuit configured to produce, at an anode connecting to the signal photodiode, a mirrored current that is a mirrored version of a portion of the dark current.

14 Claims, 4 Drawing Sheets

OFFSET CURRENT COMPENSATION FOR PHOTODIODES

BACKGROUND

The present disclosure relates to direct current (DC) offset from photodiodes and more specifically, to compensating the DC offset in a signal current from a photodiode. The photoelectric effect is the ability of many metals to emit current when light signals (photons) are absorbed. In optical applications, photodiodes can be used to convert light signals into current. This current can have an alternating current (AC) and a direct current (DC) component. The DC component can include a dark current component. The total current (both AC and DC components) can depend on the power of the absorbed photons. Furthermore, even when a photodiode absorbs zero light signals, the dark current component of the DC can still be present because dark current can be created due to the random generation of electrons and holes within a depletion region of a photodiode. DC, including the dark current, can be a source of signal noise and can inhibit electrical devices from operating properly.

SUMMARY

According to embodiments of the present disclosure, a device for compensating for direct current (DC) offset included in a signal current of a signal photodiode. In various embodiments, the device may include a dark photodiode optically isolated from the signal photodiode and having a dark current in the absence of photons. The device may also include a reference generating circuit configured to produce a reference voltage based on voltage at an anode of the signal photodiode. In addition, the device may include a voltage regulator circuit configured to regulate dark photodiode voltage at an anode of the dark photodiode based on the reference voltage. Furthermore, the device may include a current mirror circuit configured to produce, at an anode connecting to the signal photodiode, a mirrored current that is a mirrored version of a portion of the dark current.

According to embodiments of the present disclosure, a device for compensating for direct current (DC) offset included in a signal current of a signal photodiode. In various embodiments, the device may include a dark photodiode optically isolated from the signal photodiode and having a dark current in the absence of photons. The device may also include a voltage regulator circuit configured to regulate dark photodiode voltage at an anode of the dark photodiode based on the reference voltage. In addition, the device may include a current mirror circuit configured to produce, at a node connecting to the signal photodiode, a mirrored current that is a mirrored version of a portion of the dark current. Furthermore, the device may include a current digital to analog converter (IDAC) configured to compensate for the DC offset in excess of the mirrored current.

According to embodiments of the present disclosure, a method for compensating for direct current (DC) offset included in a signal current of a signal photodiode. In various embodiments, the method may include isolating, optically, a dark photodiode having a dark current in the absence of photons, from the signal photodiode. The method may also include producing a reference voltage based on voltage at an anode of the signal photodiode using a reference generating circuit. In addition, the method may include regulating voltage at an anode of the dark photodiode based on the reference voltage using a voltage regulator circuit. Furthermore, the method may include producing a mirrored current that is a mirrored version of a portion of the dark current at a node connecting to the signal photodiode using a current mirror.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
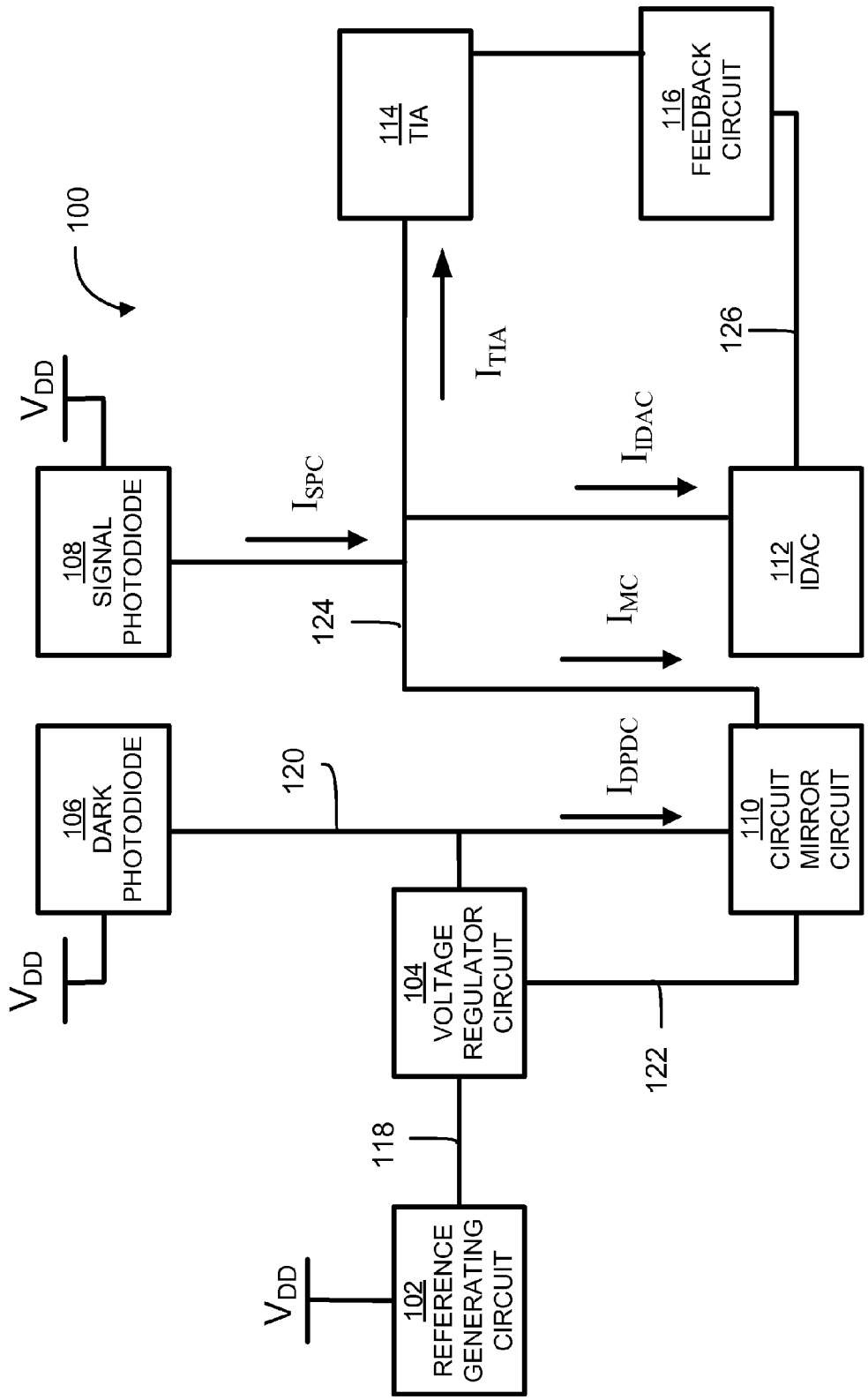
FIG. 1 depicts a high-level view of a device for compensating for DC offset that is included in a signal current of a signal photodiode, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to direct current (DC) offset from photodiodes, more particular aspects relate to compensating the DC offset in a signal current from a photodiode. While the present disclosure is not necessarily limited to such applications, various aspects of the disclosure may be appreciated through a discussion of various examples using this context.

Silicon nanophotonics uses light instead of electrical signals to transfer information for future computing systems, thus allowing large volumes of data to be moved quickly, via pulses of light, between computer chips in servers, large data-centers, and supercomputers. A silicon nanophotonics receiver can be configured to include integrated photodiodes and transimpedance amplifiers (TIA). A TIA can be configured to convert a current to a voltage. In particular embodiments, the TIA can be a simple inverter with feedback resistance, which, for proper operation, requires that the input signal current have near zero DC offset to ensure low offset at the output.

As discussed herein, a signal photodiode is a semiconductor device that is configured to convert photons into current. The signal photodiode can be a silicon photodiode with a positively charged region and a negatively charged region. Between these regions can be a depletion region that has a neutral charge. The input signal current to the TIA can be generated when photons are absorbed by the signal photodiode. That is, the energy of the absorbed photons, can bring the electrons from a lower energy level to a higher energy level, thereby inducing the input signal current. Therefore, to induce current, the energy of the absorbed photons must be large enough to bring the electrons from the lower energy level to the higher energy level. As a result, photons with greater energy can induce a larger input signal current. However, the DC offset present in the input signal current can also be directly dependent to the energy of the absorbed photons. As a result, DC offset including dark current, can increase with the increase in intensity of the absorbed photons. In certain embodiments, it is desirable that the signal current supplied to the TIA have a DC offset of near zero for the TIA to operate properly.

Various embodiments of the present disclosure are directed toward compensating for a DC offset included in a signal current of the signal photodiode. Various embodiments can include a dark current loop and a current digital to analog converter (IDAC) that are configured to compensate for DC offset of the signal photodiode portion of the device. In particular embodiments, the dark current loop can include a dark photodiode, a reference generating circuit, a voltage regulator circuit, and a current mirror circuit.

Embodiments of the present disclosure will now be described more fully hereinafter with reference to the accompanying figures. However, there can be several embodiments of the present disclosure and should not be construed as limited to the embodiments set forth. The embodiments disclosed are provided so that this disclosure can fully convey the scope of the invention to those skilled in the art. Therefore, the following detailed description is not to be taken in a limiting sense.

FIG. 1 depicts a high-level view of a device 100 for compensating for DC offset that is included in a signal current of a signal photodiode, consistent with embodiments of the present disclosure. As shown, the device 100 can include a reference generating circuit 102, a voltage regulator circuit 104, a dark photodiode 106, a signal photodiode 108, a current mirror circuit 110, an IDAC 112, a TIA 114, and a feedback circuit 116. Dark current from the dark photodiode 106 is labeled as $I_{DPDC}$, a signal current from the signal photodiode 108 that includes dark current from the signal photodiode and additional offset current is labeled as $I_{SPC}$, a mirrored current is labeled as $I_{MC}$, an input current to the IDAC 112 is labeled as $I_{IDAC}$, and an input signal current to the TIA 114 is labeled as $I_{TIA}$.

In various embodiments, the dark photodiode 106 can be configured to produce a $I_{DPDC}$ that can be mirrored to compensate for $I_{SPDC}$ in the signal current $I_{SPC}=I_{TIA}+I_{SPDC}+I_{OFFSET}$. As stated herein, photodiodes that absorb effectively zero light signals can still emit dark current. In particular embodiments, the dark photodiode can be shielded such that zero (or almost zero) light signals are absorbed by the dark photodiode. Therefore, $I_{DPDC}$ can attribute for effectively all of the current from the dark photodiode.

As discussed herein, the signal photodiode 108 can have $I_{SPC}=I_{TIA}+I_{SPDC}+I_{OFFSET}$ that can include the DC offset $I_{SPDC}+I_{OFFSET}$. The DC offset can include dark current $I_{SPDC}$ and additional offset current $I_{OFFSET}$. In particular embodiments, the dark photodiode can be designed to match the signal photodiode, i.e. both photodiodes having similar design parameters so that they will emit the same amount of dark current, $I_{DPDC}=I_{SPDC}$. If the photodiodes were perfectly matched, then mirroring $I_{DPDC}$ could effectively compensate for all the $I_{SPDC}$ in the signal photodiode. However, manufacturing tolerances are present in nearly all manufactured electrical devices including photodiodes. Therefore, in the embodiments where the dark photodiode is designed to match the signal photodiode, $I_{DPDC}$ can be more or less than $I_{SPDC}$.

Various embodiments are directed toward the device 100 that includes a dark current loop configured to avoid removing $I_{SPC}+I_{OFFSET}$. As illustrated in FIG. 1, included within the dark current loop is the reference generating circuit 102, the voltage regulator 104, the dark diode 106, and the current mirror circuit 110. As stated, electrical devices such as photodiodes can have operational tolerances when they are manufactured. For example the signal photodiode can have $I_{SPDC}=3$ mA, ±5% error. This means that $I_{SPDC}$ can be anywhere in between 2.85 mA and 3.15 mA. Furthermore, the dark photodiode can match the signal photodiode by having $I_{DPDC}=3$ mA, ±5% error. However, this can mean that in particular embodiments, $I_{DPDC}=3.15$ mA and $I_{SPDC}=2.85$ mA.

In various embodiments, to avoid the dark current loop from compensating for $I_{SPC}+I_{OFFSET}$, the current mirror circuit 110 can be configured to mirror less than $I_{DPDC}$. In particular embodiments, the current mirror circuit connects the voltage regulator circuit 104 and the dark photodiode 106 to the signal diode 108, the IDAC 112, the TIA 114, and the feedback circuit 116. The current mirror can be configured with a transfer ratio that results in $I_{MC}$ that is less than or equal to $I_{SPDC}$ when taking into consideration the manufacturing tolerances (e.g., using the worst case tolerances). For example, the transfer ratio (t) can be determined based on the formula (for all manufacturing tolerances):

$$I_{SPDC} \geq (t)(I_{DPDC}) \quad (1)$$

For example, when $I_{DPDC}$ is near the high-end of the manufactured tolerance and $I_{SPDC}$ is near the low-end of the manufactured tolerance, t can be set so that the mirrored current $I_{MC}$ (where $I_{MC}=(t)(I_{DPDC})$) is less than $I_{DPDC}$. For instance, continuing with the example above, $I_{DPDC}=3.15$ mA and $I_{SPDC}=2.85$ mA. In this case, t can be at most equal 0.904, so that formula (1) is not violated.

Various embodiments can have the current mirror circuit 110 configured to set t by configuring transistors of the current mirror. For example, the transfer ratio can be set by designing the transistors with particular channel sizes.

According to various embodiments, the IDAC can be configured to compensate for the DC offset, i.e. $(I_{SPDC}-I_{MC})+I_{OFFSET}$, that remains in $I_{SPC}$ so that $I_{TIA}=I_{SPC}$ can enter a transimpedance amplifier (TIA).

In certain embodiments, the IDAC can be configured to receive a feedback signal from feedback circuit 116 to determine the amount of $I_{IDAC}$ to remove from the signal current. For example, the feedback circuit 116 can be configured with control logic that sends a digital signal informing the IDAC the amount the voltage inside the TIA is offset after the $I_{TIA}$ enters the TIA. According to embodiments, the IDAC can be configured to convert a digital input e.g., a binary number, into an analog output $I_{IDAC}$. The IDAC can then be configured to produce $I_{IDAC}=(I_{SPDC}-I_{MC})+I_{OFFSET}$ in response to the digital signal, thereby removing $(I_{SPDC}-I_{MC})+I_{OFFSET}$ from $I_{SPC}$. $I_{TIA}=I_{SPC}$ can then enter the TIA and be converted into an output voltage.

Photodiodes that are operating at different biasing points can also have $I_{SPDC}\neq(I_{DPDC})$. Various embodiments of device 100 can be designed such that the dark photodiode and the signal photodiode can operate at approximately the same bias point. In certain embodiments, the voltage at a dark photodiode node 120 can be regulated to match the expected voltage at a signal photodiode node 124.

As illustrated, the signal photodiode can share node 124 with the input of the TIA. Furthermore, the self biasing nature of the TIA may dictate the voltage at node 124. The reference generating circuit 102 can be configured to generate a reference voltage based on the expected voltage at node 124. In certain embodiments, the reference generating circuit can produce an input voltage to the voltage regulator circuit 104 at node 118 that is close to (or equal to) the voltage at node 124. For example, a particular TIA may be designed to operate at an input voltage of 4V; therefore, the expected voltage at node 124 would be 4V. As a result, the reference generating circuit can be configured to match the voltage at node 124 by producing a reference voltage of 4V at node 118. The voltage regulator circuit can be connected to the dark photodiode node 120 and can then regulate the voltage such that the voltage at node 120 is approximately equal to the voltage at node 124, in this case, 4V.

Figure 2:
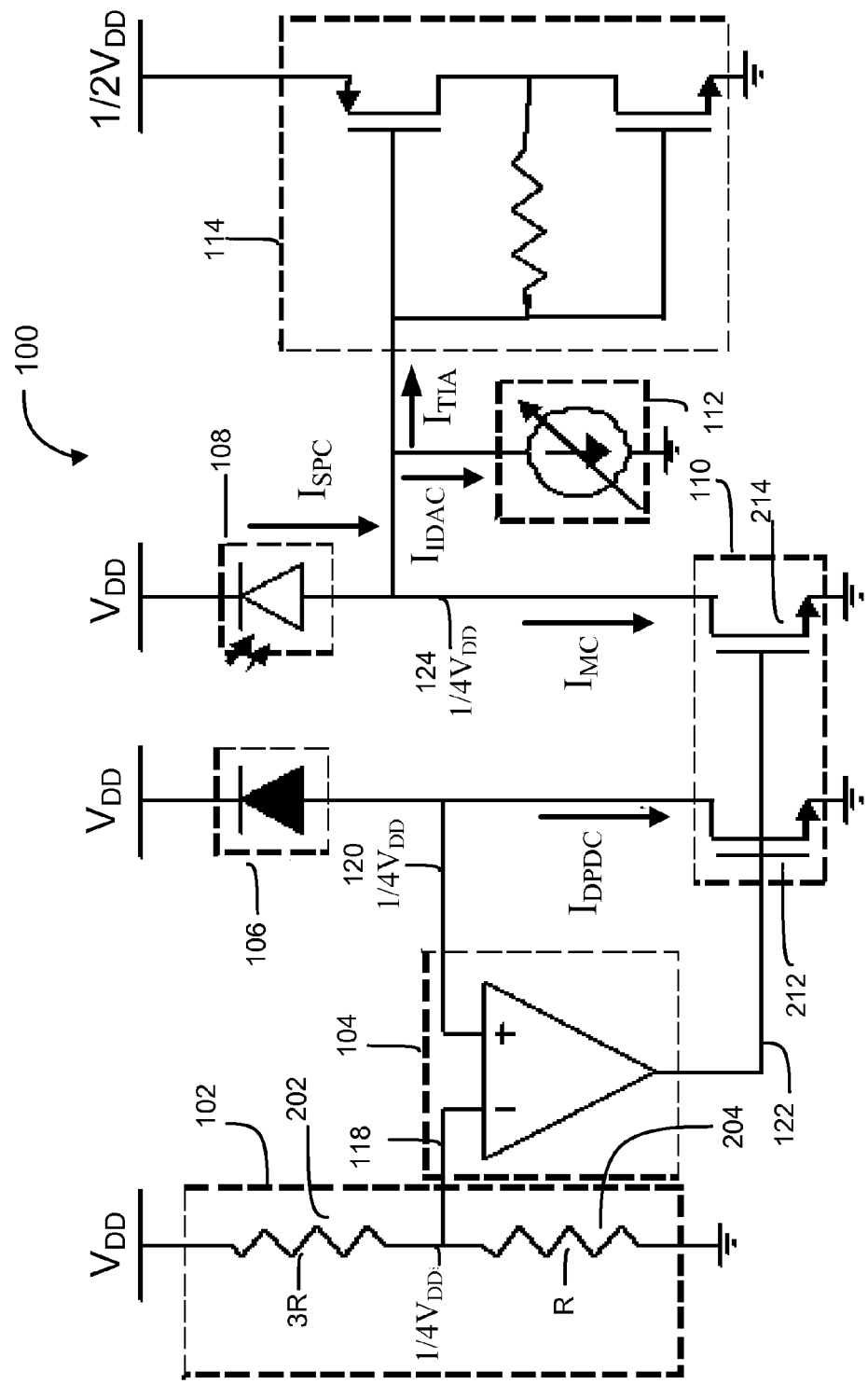
FIG. 2 depicts a circuit diagram of a device for compensating for DC offset, consistent with embodiments of the present disclosure.

FIG. 2 depicts a circuit diagram of a device 100 for compensating for DC offset, consistent with embodiments of the present disclosure. Similar to FIG. 1, the device 100 can include a reference generating circuit 102, a voltage regulator circuit 104, a dark photodiode 106, a signal photodiode 108, a current mirror circuit 110, an IDAC 112, and TIA 114. Dark current from the dark photodiode 106 is labeled as $I_{DPDC}$, a signal current from the signal photodiode 108 that includes dark current $I_{SPDC}$ from the signal photodiode and additional offset current $I_{OFFSET}$ is labeled as $I_{SPC}$, a mirrored current is labeled as $I_{MC}$, an input current to the IDAC 112 is labeled as $I_{IDAC}$, and an input signal current to the TIA 114 is labeled as $I_{TIA}$.

In certain embodiments, the dark photodiode 106 and the signal photodiode 108 can operate in reverse bias. As stated herein, the dark photodiode 106 can be configured to produce $I_{DPDC}$ that can be mirrored by the current mirror circuit 110 to compensate for $I_{SPDC}$ in $I_{SPC}=I_{TIA}+I_{SPDC}+I_{OFFSET}$. In various embodiments, the current mirror circuit can be configured with a transfer ratio t that can be dependent on the dimensions of the channels of the transistors. The dark current transistor 212 can be configured with a channel having a width of $W_1$ and a length of $L_1$. The mirrored current transistor 214 can be configured with a channel having a width of $W_2$ and a length of $L_2$. Furthermore, formula 1 must not be violated. Therefore, $t=(W_2/L_2)/(W_1/L_1)$. As a result:

$$I_{MC}=[(W_2/L_2)/(W_1/L_1)]I_{DPDC} \quad (2)$$

For example, $I_{DPDC}$=8 mA and $I_{SPDC}$=7 mA. Based on formula 1, t must be less than or equal to 0.875 so that the current mirror only compensates for $I_{SPDC}$. Therefore, the dimensions of the channels of the dark current transistor and the mirrored current transistor must be chosen such that $(W_2/L_2)/(W_1/L_1) \leq 0.875$. If transistors are chosen such that $(W_2/L_2)/(W_1/L_1) \leq 0.75$, $I_{MC}$=6 mA. As a result, 6 mA of $I_{SPDC}$ are compensated for, leaving $I_{TIA}+I_{OFFSET}$ unaffected.

In various embodiments, an IDAC 112 can compensate for $(I_{SPDC}-I_{MC})+I_{OFFSET}$ remaining in $I_{SPC}=I_{TIA}+I_{SPDC}+I_{OFFSET}$ OFFSET before it enters the TIA 114. As described herein, particular embodiments of device 100 are configured with a current mirror circuit 110 that can be designed to mirror a fraction of $I_{DPDC}$; therefore, $(W_2/L_2) \leq (W_1/L_1)$. As a result, even if the dark photodiode does not match the signal photodiode, $I_{MC}$ is less than $I_{SPDC}$. This can be particularly useful for allowing for the use of unidirectional additional compensation circuits (e.g., IDAC 112). In particular, the IDAC 112 can be designed to source additional DC offset current in a single direction, which can reduce the cost and complexity of the circuit design.

In certain embodiments, the IDAC can be configured to receive a feedback signal from a feedback circuit (not shown in FIG. 2) to determine how much $(I_{SPDC}-I_{MC})+I_{OFFSET}$ to remove. In the preceding paragraph, 6 mA of $I_{SPDC}$ removed. However, 1 mA of $I_{SPDC}$ still remains. Also included in $I_{SPC}$ is $I_{OFFSET}$=2 mA. Therefore, the feedback circuit can send a feedback signal informing the IDAC to compensate for $(I_{SPDC}-I_{MC})+I_{OFFSET}$=3 mA. The IDAC can then produce $I_{IDAC}=(I_{SPDC}-I_{MC})+I_{OFFSET}$, thereby removing the 3 mA of $(I_{SPDC}-I_{MC})+I_{OFFSET}$ from $I_{SPC}$ before it reaches the TIA. $I_{SPC}=I_{TIA}$ can then enter the TIA and be converted into an output voltage.

Various embodiments of the device 100 can be implemented in high speed receivers, such as a 25 Gbps receiver. The device is capable of operating at high speeds since the size of the IDAC is minimized by using the dark current loop to compensate for the large amount of dark current present in the photodiodes. Using a single signal current path and having the signal photodiode share node 124 with the input of the TIA also allows for higher speed. Meanwhile, the TIA is an efficient way of converting $I_{TIA}$ from the signal photodiode to a voltage that can be amplified to current mode logic (CML) levels. Furthermore, in certain embodiments, where the dark photodiode nearly or approximately matches the signal photodiode, an IDAC with high resolution and low max current can be used, lending to a highly accurate IDAC with low capacitance.

In addition, various embodiments can be designed such that the dark photodiode 106 and the signal photodiode 108 can operate at approximately the same bias point. In certain embodiments, the reference generating circuit 102 can be a resistive voltage divider circuit made up of two or more resistors 202 and 204. As stated herein, in various embodiments, the reference generating circuit can be configured to produce an input voltage to the voltage regulator circuit 104 based upon (e.g., near or equal to) the voltage at node 124 of the signal photodiode and the input of the TIA 114. In this embodiment, the voltage at node 124 is ¼ $V_{DD}$ therefore, resistor 202 is three times the value of resistor 204. As a result, the value at the input of the voltage regulator (node 118) is ¼ $V_{DD}$.

In various embodiments, the voltage regulator can include an operational amplifier 206. The reference generating circuit can produce a voltage of ¼ $V_{DD}$ at the inverting input of the operational amplifier (node 118). As shown, the non-inverting input of the operational amplifier is connected to the dark photodiode (node 120) and the output of the operational amplifier is connected to the current mirror circuit 110 (node 122). The operational amplifier can be configured to detect the voltage difference at the inverting and non-inverting inputs. If a difference in the voltage is detected, the operational amplifier can be further configured to produce an output voltage at the current mirror circuit (node 122). The current mirror circuit can then be configured to regulate the voltage at the non-inverting input (node 120) by changing the current through a dark current transistor 212 until the voltage at the non-inverting input (node 120) is equal to the voltage at the inverting input (node 118). Therefore, the operational amplifier can stabilize the voltage at the dark photodiode (node 120) so that the dark photodiode and the signal photodiode operate at approximately the same biasing point. Operating the two photodiodes at the same biasing point can be particularly useful for reducing the potential differences (mismatches) in dark current generated by each of the photodiodes. For example, by reducing or eliminating differences caused by mismatched bias voltages, the range of possible mismatches can be reduced (e.g., primarily based upon manufacturing tolerances of the photodiodes).

Figure 3:
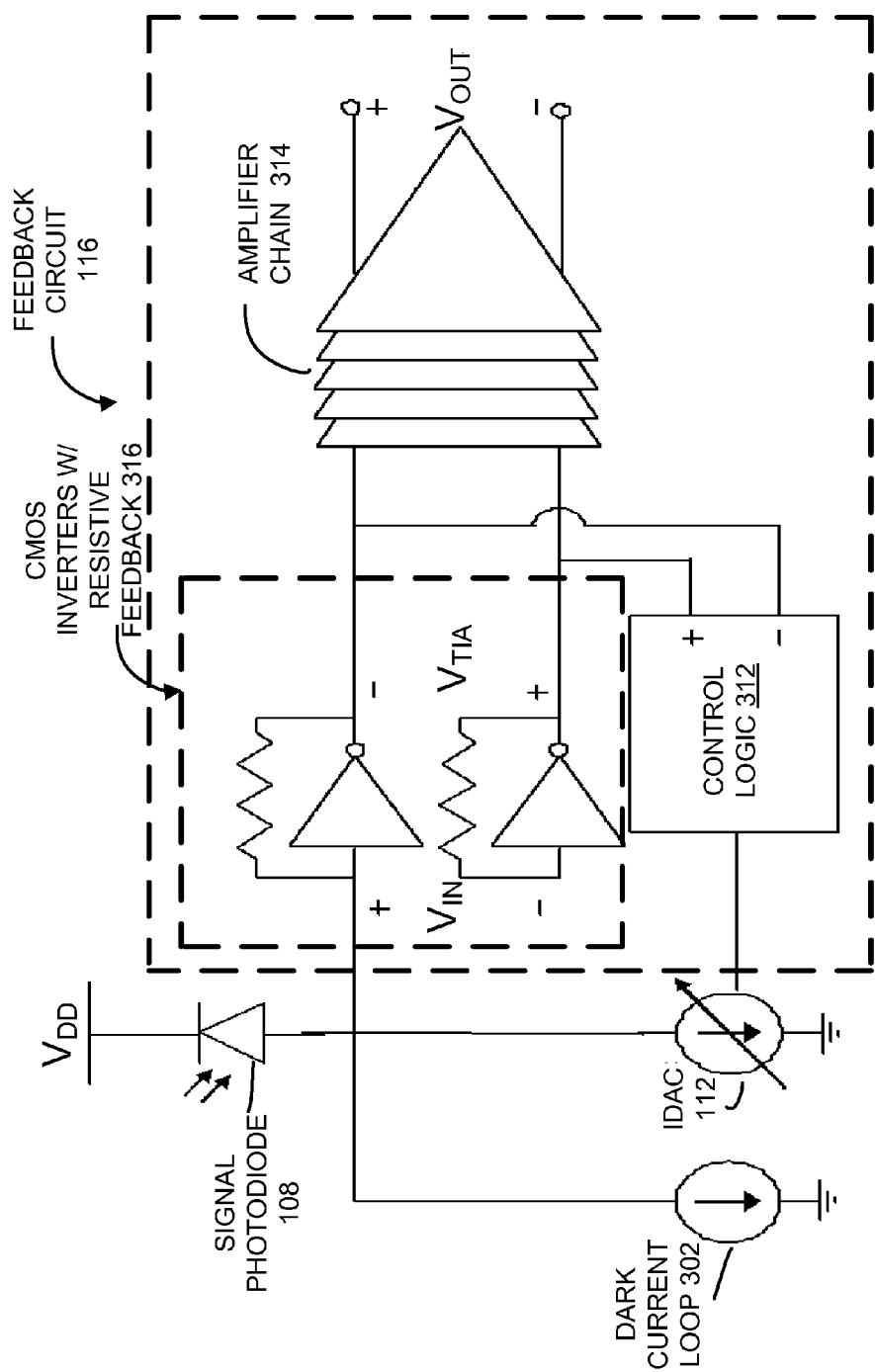
FIG. 3 depicts a logical representation of a feedback circuit for determining the remaining DC offset, consistent with embodiments of the present disclosure.

FIG. 3 depicts a logical representation of a feedback circuit 116 for determining the remaining DC offset, consistent with embodiments of the present disclosure. As shown, the feedback circuit 116 can include a pair of CMOS inverters with resistive feedback 316, an amplifier chain 314 consisting of differential pairs with resistive loads, and control logic 312.

In certain embodiments, the DC offset remaining in the signal current can be the source of an offset voltage from the different pair with resistive loads 316, which is an error voltage between a real signal and what the amplifier 314 sees. In order to drive the offset voltage to zero, the IDAC can compensate for the remaining DC offset in the signal current. In various embodiments, the offset voltage due the DC offset, can be detected and passed to the control logic 312. Based on the offset voltage, the control logic can send a feedback signal to the IDAC that tells the IDAC the amount of DC offset to remove from the signal current. The IDAC can then produce a current ($I_{IDAC}$ in FIGS. 1 and 2) thereby removing the remaining DC offset from the signal current before it reaches the TIA. For example, if zero offset voltage is detected, the control logic can send a feedback signal telling the IDAC that there is no DC offset in the signal current due to the offset voltage. However, the IDAC may still need to produce a current to remove the remaining dark current present in the signal current that was not removed by the dark current loop 302. If offset voltage is detected, the control logic can send a feedback signal telling the IDAC that there is a DC offset in the signal current due to the offset voltage. Therefore, the IDAC can produce a current to remove the DC offset due to the offset voltage and DC offset due to the remaining dark current not removed by the dark current loop.

Figure 4:
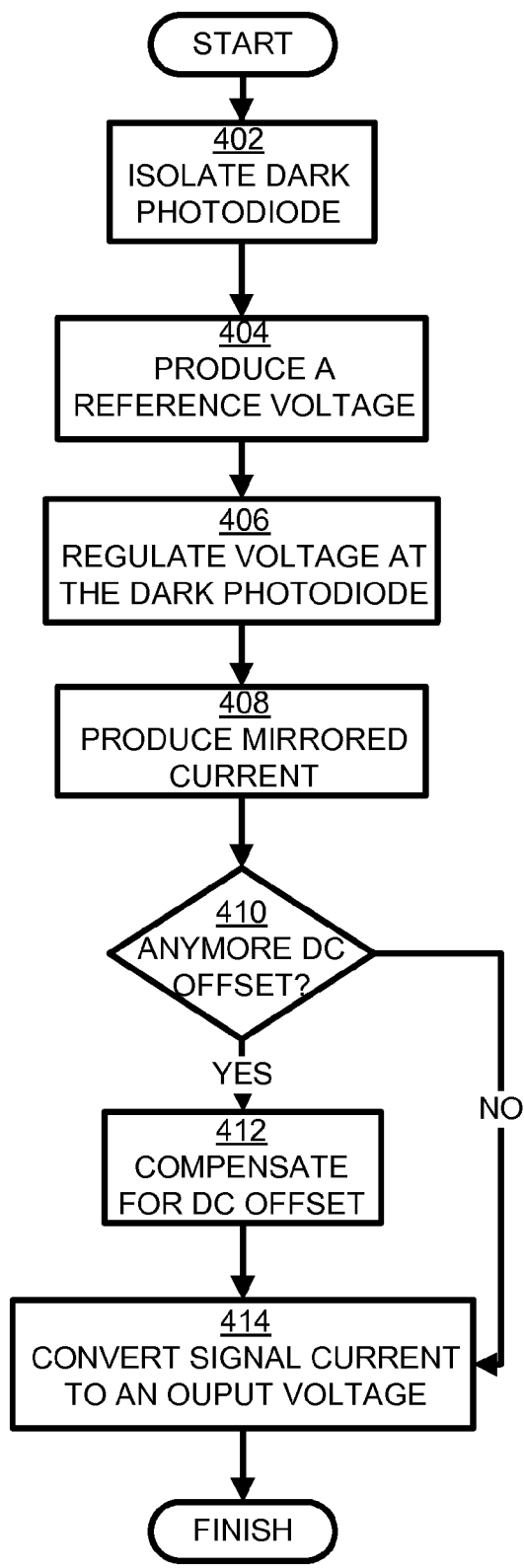
FIG. 4 depicts a method for compensating for DC offset included in a signal current of a signal photodiode, consistent with embodiments of the present disclosure.

FIG. 4 depicts a method for compensating for DC offset included in a signal current of a signal photodiode, consistent with embodiments of the present disclosure. In operation 402, a dark photodiode is optically isolated from a signal photodiode. As stated herein, the dark photodiode is a semiconductor device that has a dark current even when zero (near zero) photons are absorbed. The dark current emitted by a photodiode can be affected by the bias point of the photodiode. Furthermore, in certain embodiments, the dark photodiode and the signal photodiode operate in reverse bias. Therefore, in operation 404, a reference voltage is produced by a reference generating circuit at an input of a voltage regulator circuit based on the voltage at a node of the anode of the signal photodiode and an input of a TIA. In certain embodiments, the reference voltage can be approximately equal to the voltage at the node of the anode of the signal photodiode and the input of the TIA.

In operation 406, the voltage can be regulated at the anode of the dark photodiode by the voltage regulator circuit, based on the reference voltage. In various embodiments, the voltage regulator circuit can be an operational amplifier that has an input connected to the dark photodiode and an output connected to a current mirror circuit. The operational amplifier can be configured to detect the voltage difference at its inputs. If a difference in the voltage is detected, the operational amplifier can be further configured to produce an output voltage at the current mirror circuit. The current mirror circuit can be configured to regulate the voltage at the anode of the dark photodiode by changing the current through a dark current transistor, included in the current mirror circuit, until the voltage at the inputs of the operational ampflier are equal. Therefore, the dark photodiode and the signal photodiode can operate at approximately the same biasing point.

In operation 408, a mirrored current is produced using the current mirror circuit. The current mirror circuit can be configured to produce a mirrored current at the node of the anode of the signal photodiode. The mirrored current can be a mirrored version of a portion of the dark current from the dark photodiode. Based on formulas 1 and 2 in the discussion of FIGS. 1 and 2, the mirrored current can compensate for some or all of the dark current in the signal current depending on the transfer ratio of the current mirror circuit.

In operation 410, it is determined whether there is any remaining DC offset in the signal current. The DC offset may include dark current that was not removed from the signal current during operation 408. In certain embodiments, a feedback signal from a feedback circuit can be used to determine if DC offset needs to be removed from the signal current. If there is DC offset that needs to be removed, in operation 412, an IDAC can be configured to receive the feedback signal from the feedback circuit to determine the amount of DC offset to remove from the signal current. The IDAC can then produce a current to compensate for the remaining DC offset in the signal current. In operation 414, the signal current with effectively zero DC offset, can enter the TIA and be converted into an output voltage.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A device for compensating for direct current (DC) offset included in a signal current of a signal photodiode, the device comprising:
   a dark photodiode optically isolated from the signal photodiode and having a dark current in the absence of photons;
   a reference generating circuit configured to produce a reference voltage based on voltage at an anode of the signal photodiode;
   a voltage regulator circuit configured to regulate dark photodiode voltage at an anode of the dark photodiode based on the reference voltage; and
   a current mirror circuit configured to produce, at an anode connecting to the signal photodiode, a mirrored current that is a mirrored version of a portion of the dark current.

2. The device of claim 1, further comprising:
   a current digital to analog converter (IDAC) configured to compensate for the DC offset in excess of the mirrored current.

3. The device of claim 2, wherein the IDAC is configured to receive a feedback signal from a feedback circuit and determine the DC offset in excess of the mirrored current in response to the feedback signal.

4. The device of claim 1, further comprising:
   a transimpedance amplifier configured to convert the signal current of the signal photodiode to an output voltage.

5. The device of claim 1, wherein the voltage regulator circuit includes an operational amplifier configured to:
   detect a difference in the reference voltage and the dark photodiode voltage; and
   regulate, in response to the difference, the dark photodiode voltage by adjusting the mirror circuit.

6. The device of claim 5, wherein the current mirror circuit comprises:
   a dark current transistor configured to respond to the operational amplifier by changing a current through the dark current transistor; and a mirrored current transistor configured to produce the mirrored current by replicating a portion of the current through the dark current transistor.

7. The device of claim 1, wherein the reference generating circuit is a voltage divider.

8. A device for compensating for direct current (DC) offset included in a signal current of a signal photodiode, the device comprising:
- a dark photodiode optically isolated from the signal photodiode and having a dark current in the absence of photons;
- a voltage regulator circuit configured to regulate dark photodiode voltage at an anode of the dark photodiode based on the reference voltage;
- a current mirror circuit configured to produce, at a node connecting to the signal photodiode, a mirrored current that is a mirrored version of a portion of the dark current, and a current digital to analog converter (IDAC) configured to compensate for the DC offset in excess of the mirrored current.

9. The device of claim 8, further comprising:
- a reference generating circuit configured to produce a reference voltage based on voltage at an anode of the signal photodiode.

10. The device of claim 8, wherein the IDAC is configured to receive a feedback signal from a feedback circuit and determine the DC offset in excess of the mirrored current in response to the feedback signal.

11. The device of claim 8, further comprising:
- a transimpedance amplifier configured to convert the signal current of the signal photodiode to an output voltage.

12. The device of claim 8, wherein the voltage regulator circuit includes an operational amplifier configured to:
- detect a difference in the reference voltage and the dark photodiode voltage; and
- regulate, in response to the difference, the dark photodiode voltage by adjusting the mirror circuit.

13. The device of claim 12, wherein the current mirror circuit comprises:
- a dark current transistor configured to respond to the operational amplifier by changing a current through the dark current transistor; and
- a mirrored current transistor configured to produce the mirrored current by replicating a portion of the current through the dark current transistor.

14. The device of claim 8, wherein the reference generating circuit is a voltage divider.

* * * * *